(12) United States Patent
Simnacher

(10) Patent No.: US 8,389,861 B2
(45) Date of Patent: Mar. 5, 2013

(54) SAFETY ARM PIN

(76) Inventor: Keith Simnacher, Hereford, TX (US)

( * ) Notice: Subject to any disclaimer, the term of this patent is extended or adjusted under 35 U.S.C. 154(b) by 205 days.

(21) Appl. No.: 13/019,437

(22) Filed: Feb. 2, 2011

(65) Prior Publication Data
US 2012/0193124 A1 Aug. 2, 2012

(51) Int. Cl.
*H01B 17/20* (2006.01)

(52) U.S. Cl. ............... 174/137 R; 174/138 R; 174/169; 174/180; 200/48 R

(58) Field of Classification Search ............. 174/137 R, 174/138 R, 169, 176, 180, 158 R, 163 R; 200/48 R
See application file for complete search history.

(56) References Cited

U.S. PATENT DOCUMENTS

| 5,581,051 A * | 12/1996 | Hill ........................... 174/138 R |
| 7,737,371 B2 * | 6/2010 | Hesse ........................... 174/650 |
| 7,884,285 B2 * | 2/2011 | Spencer ...................... 174/138 F |

* cited by examiner

*Primary Examiner* — Dhirubhai R Patel
(74) *Attorney, Agent, or Firm* — Jerry D. Haynes; Law Office of Jerry D. Haynes PA.

(57) ABSTRACT

A power line insulating assembly and safety arm pin includes: an insulating section, where said insulating section includes an end portion where a fight hand threaded section is provided at the end portion for securing the insulator section to the power linen hardware, wherein the insulating section abuts an arm nut and shoulder assembly; and a safety arm pin connected to the insulating section via the nut and shoulder assembly, where arm pin includes a left handed threaded section to receive hardware for mounting the assembly on a power line transmission assembly, where said hardware is removable without loosening of the insulating section. The hardware for mounting may include a square washer, a left-handed nut and left-handed lock.

3 Claims, 4 Drawing Sheets

SAFETY ARM PIN

BACKGROUND OF THE INVENTION

1. Field of Invention

The present invention relates to a safety arm pin that includes left-handed threads to enable the removal of hardware without removing the underlying or connecting insulator of an energized power line.

2. Description of Related Art

Overhead power transmission includes the use of power distribution lines that are suspended upon towers or poles. Insulating hardware is used throughout the assembly of the power lines onto the poles to prevent sporadic and unintentional transmission of electrical surges of power while working with the installation or repair of the power lines. The overhead power lines transmit high voltages of energy throughout the electrical power grid. The high-voltage power transmission distribution lines transmit power from generating plants into populated areas for use by consumers. Many times these high-voltage power lines require maintenance and repair that includes the removal of hardware that supports the power lines. The hardware is held in place through the use of insulators throughout the power transmission distribution line grid. Many times the removal of the hardware becomes difficult or complicated due to the fact that insulating sections may loosen and be removed while the hardware is being removed from the power lines.

Consequently it would be advantageous to have suitable safety pins connected to the insulating sections of the power supports lines that would prevent the removal of the insulating section. Use of a safety pin of this manner would allow for the easier removal of hardware from the power transmission support grid.

SUMMARY OF THE INVENTION

The present invention relates to a power line insulating assembly and safety arm pin comprising: an insulating section, where said insulating section includes an end portion where a right hand threaded section is provided at the end portion for securing the insulator section to the power linen hardware, wherein the insulating section abuts a arm nut and shoulder assembly; and a safety arm pin connected to the insulating section via the nut and shoulder assembly, where arm pin includes a left handed threaded section to receive hardware for mounting the assembly on a power line transmission assembly, where said hardware is removable without loosening of the insulating section. The hardware for mounting may include a square washer, a left-handed nut and left-handed lock.

DETAILED DESCRIPTION

The present invention relates to a safety arm pin used in conjunction with a power line insulator section that includes left-handed threads to provide for the removal of hardware to ensure that the insulator remains intact while the hardware bolts are removed from the safety arm pin. The left-handed threads enables individuals to loosen the nuts on the energized line without the insulator unscrewing from the pin.

Figure 1:
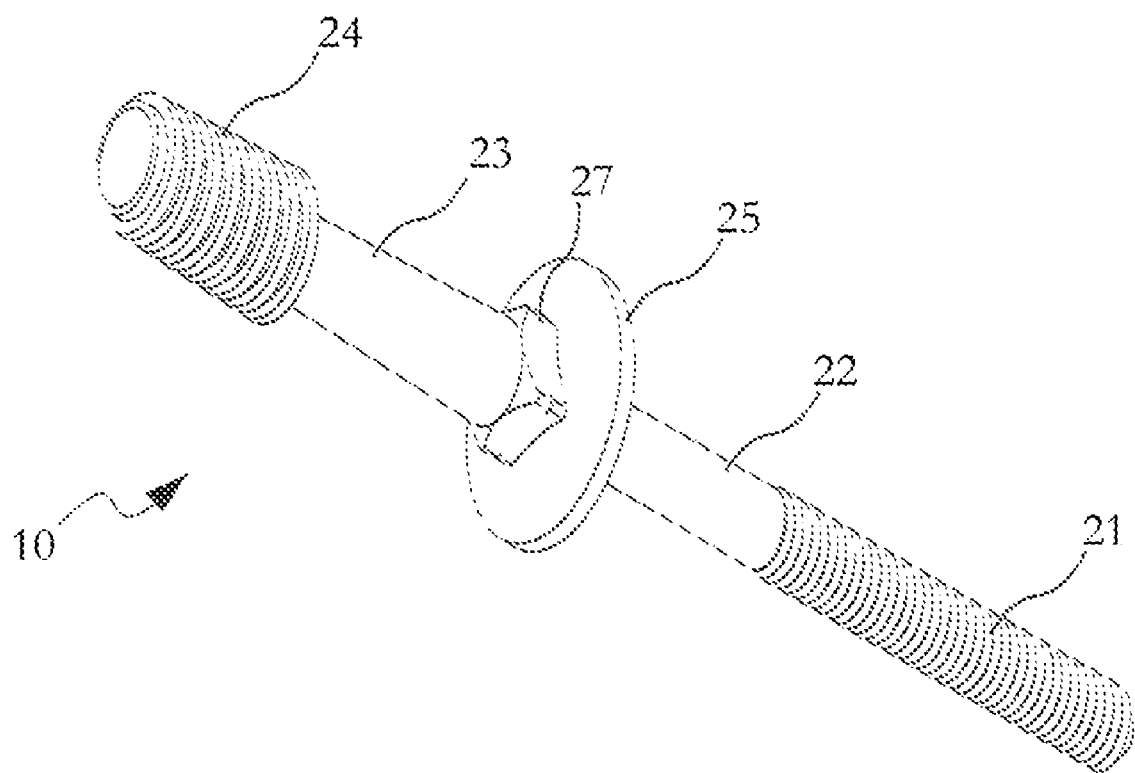
FIG. 1 depicts a perspective view of a safety arm pin according to the present invention connected to an insulating section.

FIG. 1 depicts a perspective view of the safety arm pin used in conjunction with the insulator according to the present invention. The Safety Arm Pin 22 includes a section of Left-Handed Threads 21 at the distal end thereof. The Safety Arm Pin 22 includes a Shoulder 25 that abuts a Square-Head Nut 27 that connects the Insulator Section 23 to the Safety Arm Pin 22. The Insulator Section 23 includes threads at End Portion 24. The threaded End Portion 24 is a conventional right-hand threaded section that secures the insulator section to the power line hardware. The Complete Assembly 10 of the present invention enables the removal of hardware from the left-handed threaded section of the safety arm pin without the removal of the insulator section from the power line hardware.

Figure 2:
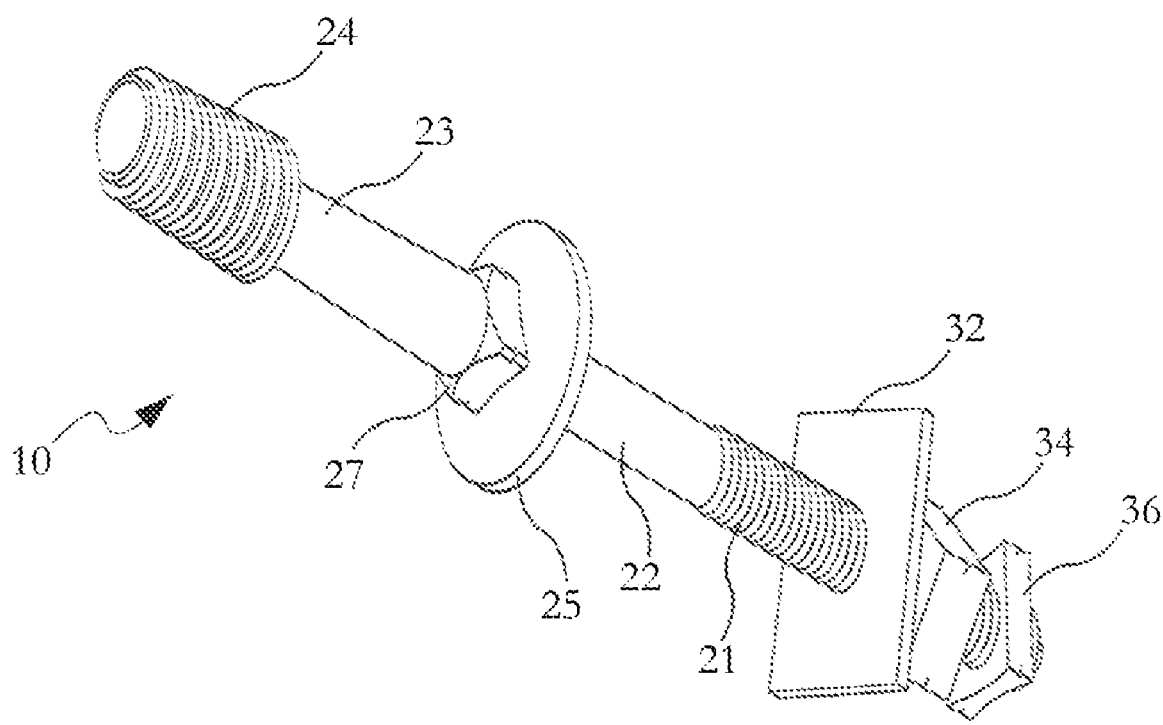
FIG. 2 depicts the safety arm pin according to the present invention with the inclusion of hardware onto the left-handed threaded section of the safety pin.
Figure 3:
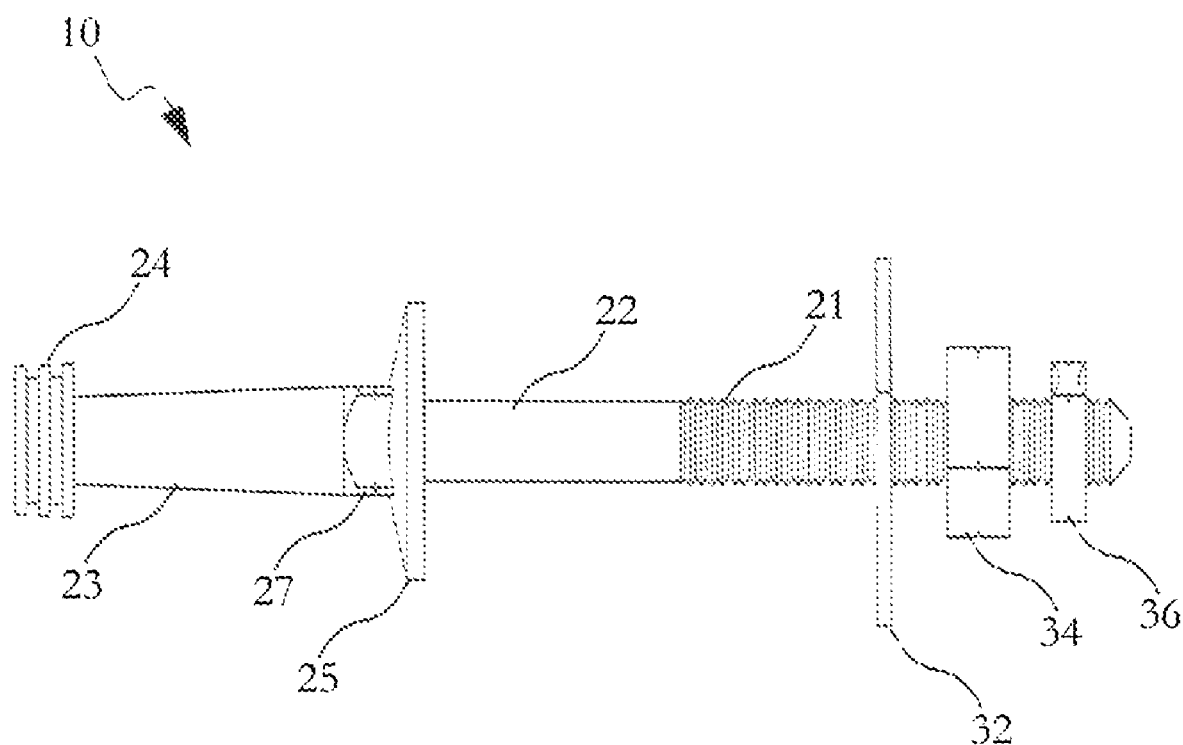
FIG. 3 depicts a side view of the hardware on the safety arm pin according to the present invention.

FIG. 2 depicts the assembly of hardware onto the Safety Arm Pin 22. As noted a Square Washer 32, Left-Handed Nut 34 and Left-Hand Lock 36 are shown on the Threads 21 of the Safety Arm Pin 22. The hardware, particularly the Square Washer 32, Left-Handed Nut 34 and Left-Hand Lock 36, may be removed from the Safety Arm Pin 22 without the loosening of the connected Insulator Section 23. A side view of this assembly is depicted in FIG. 3 shows that the Square Washer 32, Left-Handed Nut 34 and Left-Hand Lock 36 may be tightened into position on the Safety Arm Pin 22 and removed therefrom without loosening the Insulator Section 23. The Square Head 27 enables the user to loosen the insulator as needed without affecting the use of the Safety Arm Pin 22.

Figure 4:
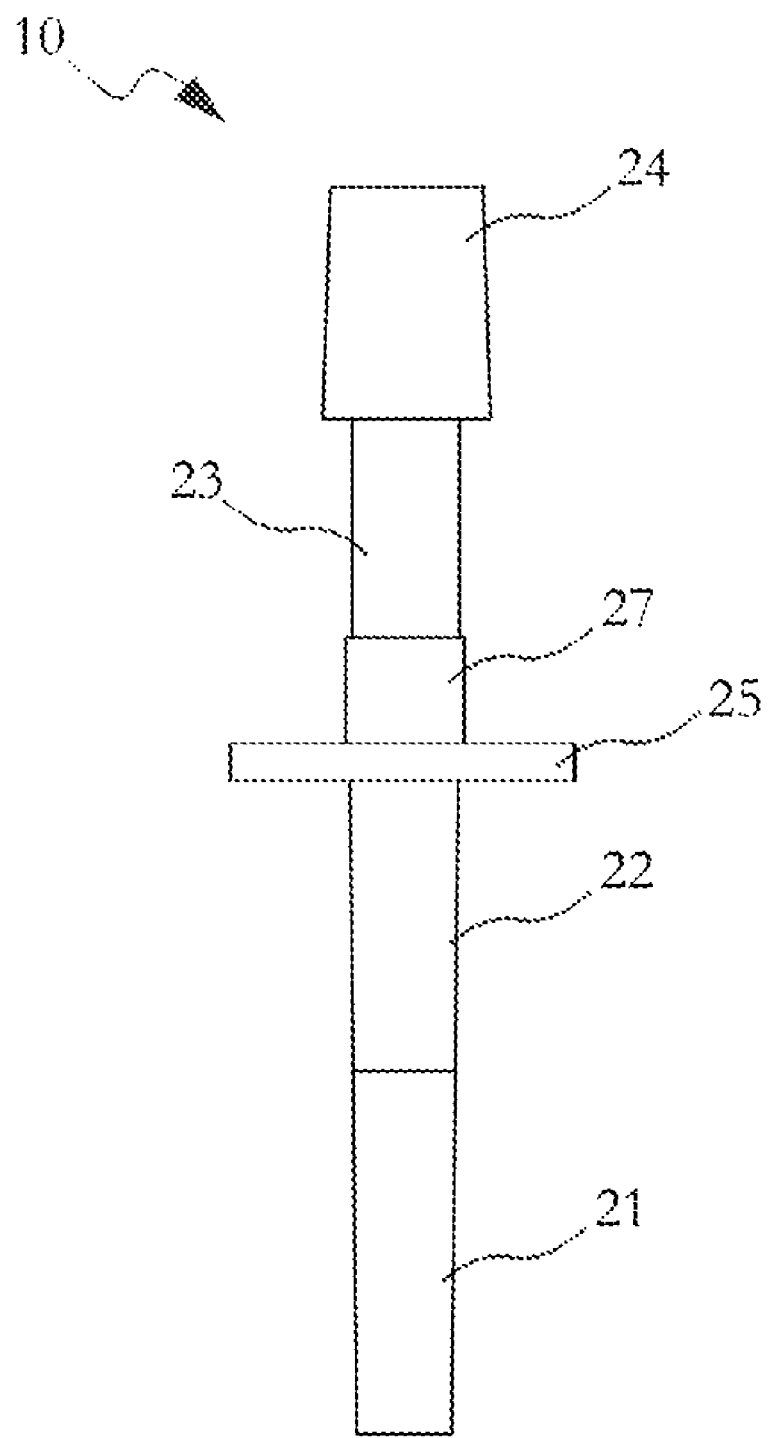
FIG. 4 depicts a side view of the dimensional aspects of the insulator connected to the safety arm pin according to the present invention.

FIG. 4 depicts some of the dimensional aspects of the Assembly 10. A progression of diameters is shown on the Safety Arm Pin 22 with a first dimension of the safety arm pin and a second dimension of the Threaded Section 21. In one particular embodiment, the Safety Arm Pin 22 may have the dimension of 0.625 inches and a dimension of 0.59375 inches at the threaded portion. The Shoulder Arm Nut 25 may have a dimension of 2 inches in one particular embodiment or alternatively 3 inches in a second embodiment of the present invention. The Shoulder Square Head 27 may include dimensions of 0.875 inches or alternatively 1.12 inches. With respect to the insulator section the attached Threaded End 24 may have the dimensions of 1.125 inches or alternatively 1.4375 inches. The Insulator Section 23 may have the dimensions of 0.75 inches or alternatively 1.0 inches.

The safety arm pin according to the present invention includes the left-handed thread section to prevent the insulator from being removed from the energized power lines when loosening hardware attached to the safety arm pin. This alternative design allows a user to loosen the insulator to ensure that other bolts remain in place and secure. This feature of left-handed threads may be useful for any utility company and is specifically applicable on the high-voltage electrical power transmission distribution lines. The instant invention has been shown and described in what it considers to be the most practical and preferred embodiments. It is recognized, however, that departures may be made there from within the scope of the invention and that obvious modifications will occur to a person skilled in the art.

What is claimed is:

1. A power line insulating assembly and safety arm pin comprising:
   a. an insulating section, where said insulating section includes an end portion where a right hand threaded section is provided at the end portion for securing the insulator section to the power linen hardware, wherein the insulating section abuts an arm nut and shoulder assembly; and b. a safety arm pin connected to the insulating section via the nut and shoulder assembly, where the arm pin includes a left handed threaded section to receive a square washer, a left-handed nut and left-handed lock for mounting the assembly on a power line transmission assembly, where said hardware is removable without loosening of the insulating section.

2. The power line assembly according to claim 1, where the arm pin includes a first dimension, the left handed section includes a second dimension, the shoulder includes a third dimension, the head nut includes a fourth dimension, the insulator section includes a fifth dimension and the end portion includes sixth dimension.

3. The power line assembly according to claim 2, where the first dimension is about 0.625 inches, the second dimension is about 0.59375, the third dimension is one of about 2 or 3 inches, the fourth dimension is one of about 0.875 or 1.12 inches, the fifth dimension is one of about 1.125 or 1.4375 inches and the sixth dimension is one of about 0.75 or 1.0 inches.

* * * * *